(12) United States Patent
Jeong et al.

(10) Patent No.: US 9,552,230 B2
(45) Date of Patent: Jan. 24, 2017

(54) APPARATUS AND METHOD FOR ALLOCATING A TASK BASED ON MEASURED AND ESTIMATED CORE USAGE

(75) Inventors: Hyunku Jeong, Daejeon-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 802 days.

(21) Appl. No.: 13/267,214

(22) Filed: Oct. 6, 2011

(65) Prior Publication Data

US 2013/0024868 A1 Jan. 24, 2013

(30) Foreign Application Priority Data

Jul. 21, 2011 (KR) .................. 10-2011-0072669

(51) Int. Cl.
G06F 9/46 (2006.01)
G06F 19/00 (2011.01)
G06F 1/26 (2006.01)
G06F 9/50 (2006.01)

(52) U.S. Cl.
CPC ..................... G06F 9/505 (2013.01)

(58) Field of Classification Search
None
See application file for complete search history.

(56) References Cited

U.S. PATENT DOCUMENTS

| | | | |
|---|---|---|---|
| 7,441,244 B2 * | 10/2008 | Longobardi | G06F 9/5083 718/100 |
| 7,685,599 B2 | 3/2010 | Kanai et al. | |
| 7,831,325 B1 * | 11/2010 | Zhang et al. | 700/108 |
| 8,010,822 B2 | 8/2011 | Marshall et al. | |
| 8,386,636 B2 * | 2/2013 | Asaki et al. | 718/106 |
| 2009/0249094 A1 * | 10/2009 | Marshall et al. | 713/320 |
| 2010/0250748 A1 * | 9/2010 | Sivasubramanian et al. | 709/226 |
| 2010/0332876 A1 * | 12/2010 | Fields et al. | 713/323 |

FOREIGN PATENT DOCUMENTS

| | | | | |
|---|---|---|---|---|
| EP | 2141626 A1 * | 1/2010 | | G06F 21/55 |
| JP | 2009-163527 | 7/2009 | | |
| JP | 2010-079622 | 4/2010 | | |
| KR | 10-0628492 | 9/2006 | | |
| KR | 10-2010-0138954 | 12/2010 | | |

* cited by examiner

*Primary Examiner* — Bing Zhao
(74) *Attorney, Agent, or Firm* — NSIP Law

(57) ABSTRACT

A task allocating apparatus capable of improving task processing performance is provided. The task allocating apparatus measures a core usage of a plurality of tasks that are run in multiple cores, according to predetermined periods, estimates a core usage of each task for a following period based on the measured core usages, and allocates one or more tasks to the multiple cores based on the estimated core usage.

19 Claims, 11 Drawing Sheets

| PERIOD / TASK | 1 | 2 | 3 | 4 | 5 |
|---|---|---|---|---|---|
| T1 | | V(1.2) | V(1.4) | V(1.5) | V(1.6) |
| T2 | | V(0.8) | V(0.6) | V(0.5) | V(0.4) |

FIG. 2A

| PERIOD / TASK | 1 | 2 | 3 |
|---|---|---|---|
| T1 | 0.8 | 0.4 | 0.3 |
| T2 | 0.4 | 0.4 | 0.1 |
| T3 | 0.2 | 0.4 | 0.8 |
| T4 | 0.6 | 0.6 | 0.6 |

| PERIOD / TASK | 1 | 2 | 3 | 4 |
|---|---|---|---|---|
| T1 | | | E(0.2) | E(0.5) |
| T2 | | | E(0.4) | E(0.1) |
| T3 | | | E(0.8) | E(1.6) |
| T4 | | | E(0.6) | E(0.6) |

| TASK\PERIOD | 1 | 2 | 3 | 4 |
|---|---|---|---|---|
| T1 | | | V(0.2) | V(0.25) |
| T2 | | | V(0.4) | V(0.13) |
| T3 | | | V(0.8) | V(1.2) |
| T4 | | | V(0.6) | V(0.42) |

| PERIOD | 1 | 2 | 3 | 4 |
|---|---|---|---|---|
| T1 | | | E(1.7), F, N | E(1.4), F, N |
| T2 | | | E(0.3), B, N | E(1.2), B, N |
| T3 | | | E(0.3), B, N | E(0.2), B, N |
| T4 | | | E(0.8), B, R | E(0.1), B, R |

| POLICY |
|---|
| P1: APPLY FROM UPPER MOST |
| P2: PRIORITIZE RT JOB |
| P3: FOREGROUND: 1.7, BACKGROUND: 0.3 |
| P4: PRIORITIZE JOB HAVING CORE USAGE OF E (0.2) OR BELOW |
| P5: MINIMUM CORE USAGE OF 0.1 |
| P6: ALLOCATE REMAINING CORE RESOURCES IN PROPORTIONAL TO E(CORE USAGE) |

FIG. 3C

| PERIOD | 1 | 2 | 3 | 4 |
|---|---|---|---|---|
| T1 | | | V(1.2) | V(1.4) |
| T2 | | | V(0.0) | V(0.3) |
| T3 | | | V(0.0) | V(0.2) |
| T4 | | | V(0.8) | V(0.1) |

| PERIOD<br>TASK | 1 | 2 | 3 | 4 | 5 |
|---|---|---|---|---|---|
| T1 |  | V(1.3) | V(1.4) | V(1.5) | V(1.9) |
| T2 |  | V(0.7) | V(0.6) | V(0.5) | V(0.1) |

FIG. 4B

| PERIOD / TASK | 1 | 2 | 3 | 4 | 5 |
|---|---|---|---|---|---|
| T1 |  | V(1.3) | V(1.4) | V(1.5) | V(1.7) |
| T2 |  | V(0.7) | V(0.6) | V(0.5) | V(0.3) |

FIG. 4C

| PERIOD<br>TASK | 1 | 2 | 3 | 4 | 5 |
|---|---|---|---|---|---|
| T1 |  | V(1.2) | V(1.4) | V(1.5) | V(1.6) |
| T2 |  | V(0.8) | V(0.6) | V(0.5) | V(0.4) |

APPARATUS AND METHOD FOR ALLOCATING A TASK BASED ON MEASURED AND ESTIMATED CORE USAGE

CROSS-REFERENCE TO RELATED APPLICATION(S)

This application claims the benefit under 35 U.S.C. §119 (a) of Korean Patent Application No. 10-2011-0072669, filed on Jul. 21, 2011, in the Korean Intellectual Property Office, the entire disclosure of which is incorporated herein by reference for all purposes.

BACKGROUND

1. Field

The following description relates to a technology for allocating tasks to processing cores.

2. Description of the Related Art

Recently, there is an increasing need to process a large amount of data such as video and image data. The processing of a large data can be complicated and can take a great deal of time. Large data processing increases the amount of a job that is processed by one core.

Various methods are used to process a large job over a short amount of time. For example, a method may improve the hardware performance of cores. As another example, software may be developed to effectively operate cores. One such method for improving processing speed is to process data in a parallel scheme. In the parallel scheme, multiple cores process data in a distributed manner. Accordingly, the time it takes to process data in the parallel scheme is decreased in comparison to the time it takes to process data in a sequential manner using a single core.

In order to improve processing speed using multiple cores, there is a need for a technology that allocates data to the multiple cores.

SUMMARY

In one general aspect, there is provided an apparatus for allocating tasks, the apparatus including a measuring unit configured to measure a core usage of a plurality of tasks that are run in multiple cores, according to predetermined periods, an estimating unit configured to estimate a core usage of each task of the plurality of tasks for a following period based on the measured core usages, and an allocating unit configured to allocate one or more of the tasks to the multiple cores based on the estimated core usage of each task for the following period.

The estimating unit may be further configured to extract operation characteristics of each task and estimate the core usage of each task for the following period based on the extracted operation characteristics of the each task.

The operation characteristics may comprise at least one of information indicating whether a task is a real time task, information indicating whether the task is a foreground task or a background task, information corresponding to a list of tasks having been allocated to the cores and information indicating a priority of the tasks.

The estimating unit may be configured to estimate the core usage of each task for the following period based on at least one of an average value, an increment value, and a decrement value of the measured core usages.

The estimating unit may be configured to estimate the core usage of each task for the following period based on a difference between a core usage of each task measured at a certain period and a core usage of each task estimated at the certain period.

The estimating unit may be configured to estimate the core usage of each task for the following period based on the measured core usages and a predetermined policy.

The predetermined policy may comprise a policy of allowing a task having a core usage lower than a predetermined core usage to be run primarily, a policy of allowing a real time task to be run primarily, and a policy of preventing a background task from having a core usage higher than a predetermined core usage.

If a difference between a core usage of a task estimated at a current period and a core usage of the task estimated N-periods ahead of the current period exceeds a predetermined value, the allocating unit may be configured to allocate the task to the multiple cores based on the estimated core usage.

If a variation of the estimated core usage of a task exceeds a predetermined variation, the allocating unit may be configured to allocate the task to the multiple cores based on the estimated core usage.

In another aspect, there is provided a method for allocating tasks, the method including measuring a core usage of a plurality of tasks that are run in multiple cores, according to predetermined periods, estimating a core usage of each task of the plurality of tasks for a following period based on the measured core usages, and allocating one or more of the tasks to the multiple cores based on the estimated core usage of each task for the following period.

The estimating of the core usage for each task for the following period may comprise extracting operation characteristics of each task, and estimating the core usage of each task for the following period based on the extracted operation characteristics of each task.

The operation characteristics may comprise at least one of information indicating whether a task is a real time task, information indicating whether the task is a foreground task or a background task, information corresponding to a list of tasks having been allocated to the cores, and information indicating a priority of the tasks.

The estimating of the core usage of each task for the following period may be based on at least one of an average value, an increment value, and a decrement value of the measured core usages.

The estimating of the core usage of each task for the following period may be based on a difference between a core usage of each task measured at a certain period and a core usage of each task estimated at the certain period.

The estimating of the core usage for each task for the following period may be based on the measured core usages and a predetermined policy.

The predetermined policy may comprise a policy of allowing a task having a core usage lower than a predetermined core usage to be run primarily, a policy of allowing a real time task to be run primarily, and a policy of preventing a background task from having a core usage higher than a predetermined core usage.

If a difference between a core usage of a task estimated at a current period and a core usage of the task estimated N-periods ahead of the current period exceeds a predetermined value, the allocating may comprise allocating the task to the multiple cores based on the estimated core usage.

If a variation of the estimated core usage of a task exceeds a predetermined variation, the allocating may comprise allocating the task to the multiple cores based on the estimated core usage.

In another aspect, there is provided a computer-readable storage medium storing a program instruction that is used to implement a task allocating method, in which the task allocating method including measuring a core usage of a plurality of tasks that are run in multiple cores, according to predetermined periods, estimating a core usage of each task of the plurality of tasks for a following period based on the measured core usages, and allocating one or more of the tasks to the multiple cores based on the estimate core usage of each task for the following period.

The estimating may comprise estimating the core usage of each task for the following period based on at least one of an average value, an increment value, and a decrement value of the measured core usages.

Other features and aspects may be apparent from the following detailed description, the drawings, and the claims.

BRIEF DESCRIPTION OF THE DRAWINGS

FIGS. 2A, 2B, and 2C are diagrams illustrating examples of estimating tasks.

FIGS. 3A, 3B, and 3C are diagrams illustrating additional examples of estimating tasks.

FIGS. 4A, 4B, and 4C are diagrams illustrating examples of allocating tasks to cores when a predetermined criteria is satisfied.

Figure 1:
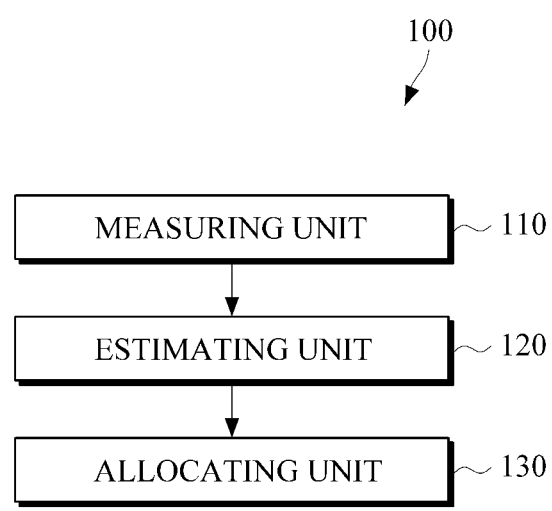
FIG. 1 is a diagram illustrating an example of an apparatus for allocating tasks.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus 100 for allocating tasks.

The task allocating apparatus 100 may be applicable to a multi core system or a many core system. An example of the multi core system is a multi core processor. For example, the task allocating apparatus 100 may be a host processor, a scheduler, and the like. The task allocating apparatus 100 may be included in a device such as a terminal, a smart phone, a laptop computer, a desktop computer, a server, a tablet, a home appliance, and the like.

Referring to FIG. 1, the task allocating apparatus 100 includes a measuring unit 110, an estimating unit 120, and an allocating unit 130.

The measuring unit 110 may measure a core usage of each task that is run in multiple cores. For example, measuring unit 110 may measure a core usage according to predetermined periods. In various examples, the core usage may be used to represent the amount of a core that is being used per a unit of time. The core usage may be measured by a device such as a performance measurement unit (PMU). The tasks may be executed in the multiple cores in a parallel manner. In some examples, the predetermined period may vary by user or by a manufacturer. The predetermined period may be changed in the middle of the execution of the task allocating apparatus 100. The predetermined period may be larger than an operation period of the core.

The estimating unit 120 may estimate a core usage of each task for a following period based on the measured core usages measured by the measuring unit 110. For example, the measured core usages may include a core usage measured at a current period and to a core usage measured at N-periods ahead of the current period.

For example, the estimating unit 120 may estimate the core usage of each task for the following period (n+1) based on a core usage measured at a current period (n), a core usage measured at one-period prior to the current period (n−1), and a core usage measured at two-periods prior to the current period (n−2). As another example, the estimating unit 120 may estimate the core usage of each task for the following period (n+1) based on a core usage measured at a current period (n), a core usage measured at one-period prior to the current period (n−1), a core usage measured at two-periods prior to the current period (n−2) and a core usage measured at three periods prior to the current period (n−3). As another example, the estimating unit 120 may estimate the core usage of each task for the following period (n+1) based on a core usage measured at a current period (n), a core usage measured at two-periods prior to the current period (n−2) and a core usage measured at four-periods prior to the current period (n−4). It should be appreciated that the method of estimating the core usage of each task for the following period is not limited as described in these examples, and may be implemented in various schemes.

The estimating unit 120 may estimate the core usage of each task for the following period based on the core usages measured by the measuring unit 110. For example, the estimating unit 120 may estimate the core usage of each task for the following period based on the average value of the measured core usages. As another example, the estimating unit 120 may estimate the core usage of each task for the following period based on core usages measured at incremental values or decremental values of the measured core usages. As another example, the estimating unit 120 may assign a weight to each of the measured core usages and estimate the core usage of each task for the following period based on the average value, the increment value, and/or the decrement value of the measured core usages that have been assigned a weight. The method of estimating the core usage of each task for the following period is not limited thereto, and may be implemented in various schemes.

The estimating unit 120 may estimate the core usage of a task for the following period based on a difference between a core usage of the task measured at a certain period and a core usage of the task estimated at the certain period. For example, if the difference between a core usage measured at a second period and a core usage estimated at the second period is great, the estimating unit 120 may determine that the estimated core usage is inaccurate. In this example, the estimating unit 120 may estimate the core usage of the task for the following period based on the difference between the core usage measured at the second period and the core usage measured at the second period.

The estimating unit 120 may extract operation characteristics of tasks. For example, the estimating unit 120 may extract operation characteristics from an apparatus that stores information about operation characteristics of tasks and/or an apparatus that manages the operation of tasks. The estimating unit 120 may estimate the core usage of each task for the following period based on the estimated core usage and the extracted operation characteristics of the tasks. For example, the operation characteristics of the tasks may include information indicating whether the task is a real time task, information indicating the task is a foreground task or a background task, information corresponding to a list of tasks that have been allocated to the cores, information indicating a priority of the tasks, and the like. An example of a real time task is a task that is to be processed before a predetermined time. An example of a non-real time task is a task that is processed without a time limit. An example of a foreground task is a task that is executed as communication is performed with a user through a terminal or a display. An example of a background task is a task that is executed without the need of a communication with a user.

The estimating unit 120 may estimate the core usage of each task for the following period based on at least one of the measured core usages and a predetermined policy. For example, the predetermined policy may be a policy of allowing a task having a core usage lower than a predetermined core usage to be run primarily, a policy of allowing a real time task to be run primarily, a policy of allowing a real time task to run before a predetermined time, a policy of preventing a background task from having a core usage higher than a predetermined core usage, a policy of allowing a task to have a core usage higher than a minimum core usage, a policy of preventing a variation of a core usage for each task from exceeding a maximum core usage variation, a policy of allowing a variation of a core usage of each task to exceed a minimum core usage, and the like.

As an example, if the predetermined policy is a policy of allowing a real time task to be run primarily, the estimating unit 120 may extract a real time task from the tasks, and estimate a core usage of the extracted real time task such that the extracted real time task is primarily allocated to the cores.

The allocating unit 130 may allocate task to cores based on the estimated core usage. For example, if the difference between a core usage of a task obtained at a current period and a core usage of the task obtained at N-periods ahead of the current period, exceeds a predetermined value, the allocating unit 130 may allocate the task to cores based on the estimated core usage. As another example, if the difference between a core usage of a task at a current period and a core usage of the task obtained at N-periods ahead of the current period, is below a predetermined value, the allocating unit 130 may not allocate the task to the cores. That is, if it is determined that tasks do not need to be allocated to cores, the task allocating process may not be performed. Accordingly, the load of a system may be prevented from increasing unnecessarily.

The allocating unit 130 may allocate a task to the cores based on the estimated core usage if the variation of the estimated core usage of the task exceeds a predetermined variation.

This example of the task core allocating apparatus 100 may estimate a core usage for the following period based on a core usage of each task that has been run in the multiple cores, and allocate each task to the multiple cores based on the estimated core usage for the following period, thereby improving the performance of processing tasks.

In addition, the task core allocating apparatus 100 may not allocate tasks to cores at a fixed ratio but allocate the tasks to cores at a ratio varying based on the operation characteristics. Accordingly, the task allocating apparatus 100 may dynamically allocate tasks to cores.

FIGS. 2A, 2B, and 2C illustrate examples of estimating tasks.

The following example includes a case in which two cores including a first core and a second core are provided and tasks T1, T2, T3 and T4 continuously exist in a ready queue. However, the disclosure is not limited thereto, and the number of the cores, the number of the tasks, and the continuous existing of the tasks may vary.

FIG. 2A shows a core usage of each of the tasks measured according to predetermined periods.

Referring to FIGS. 1 and 2A, the task allocating apparatus 100 may measure a core usage (200, 210 and 220) of tasks T1, T2, T3 and T4, which have been run in two cores, according to predetermined periods. As an example, if the task T1 uses half of the total usage of the two cores during a predetermined period, the task T1 may be referred to as having a core usage of '1', and if the task T2 uses the total usage of the two cores during a predetermined period, the task T1 may be referred to as having a core usage of '2'. For example, if task T1 has a core usage of '1', the task T1 may use only the first core, use half of the usage of the first core and half of the usage of the second core, use two third of the usage of the first core and one third of the usage of the second core, and the like, during a predetermined period.

Referring to FIGS. 1 and 2B, the task allocating apparatus 100 may estimate each core usage of the tasks for the following period based on at least one of the measured core usages. Various examples herein include a case in which each core usage of the tasks for the following period is estimated based on cores usages including a core usage measured at the current period and core usages measured at all preceding periods that are ahead of the current period. However, the task allocating apparatus 100 may use only some of the measured core usages corresponding to several periods instead of all measured core usages corresponding to all periods. Hereinafter, an estimation consisting of a preliminary estimated core usage is denoted as 'E (core usage)'.

Referring to FIGS. 1, 2A and 2B, when viewed in relation to the second period, the task allocating apparatus 100 may estimate each core usage of the tasks for the third period based on the core usage 200 and the core usage 210 that are measured at the first period and the second period, respectively. For example, the task allocating apparatus 100 may obtain a preliminary estimated core usage 230 of the tasks for the third period during the two periods including the first period and the second period.

In FIG. 2A, when viewed in relation to the task T1, the core usage measured at the first period is 0.8 and the core usage measured at the second period is 0.4. In this example, the core usage decreases by half each period. Accordingly, the task allocating apparatus 100 estimates a core usage for the third period as 0.2 (see the preliminary estimated core usage 230 in FIG. 2B) that is half the measured core usage of 0.4 of the second period in FIG. 2A. The estimation of is the preliminary estimated core usage of the task T1 at the third period is denoted as E (0.2) in FIG. 2B.

In FIG. 2A, when viewed in relation to the task T2, the core usage measured at the first period is 0.4 and the core usage measured at the second period is 0.4. In this example, the core usage remains the same each period. Accordingly, the task allocating apparatus 100 estimates a core usage for the third period as 0.4 (see the preliminary estimated core usage 230 in FIG. 2B) that is the same as the measured core usage of 0.4 of the second period in FIG. 2A. The estimation of the preliminary estimated core usage of the task T2 at the third period is denoted as E(0.4) in FIG. 2B.

In FIG. 2A, when viewed in relation to the task T3, the core usage measured at the first period is 0.2 and the core usage measured at the second period is 0.4. In this example, the core usage doubles each period. Accordingly, the task allocating apparatus 100 estimates a core usage at the third period as 0.8 (see the preliminary estimated core usage 230 in FIG. 2B) that is twice the measured core usage of 0.4 of the second period shown in FIG. 2A. The estimation of the preliminary estimated core usage of the task T3 at the third period is denoted as E (0.8) in FIG. 2B.

In FIG. 2A, when viewed in relation to the task T4, the core usage measured at the first period is 0.6 and the core usage measured at the second period is 0.6. In this example, the core usage remains the same each period. Accordingly, the task allocating apparatus 100 estimates a core usage at the third period as 0.6 (see the preliminary estimated core usage 230 in FIG. 2B) that is the same as the measured core usage of 0.6 of the second period in FIG. 2A. The estimation of the preliminary estimated core usage at the third period is denoted as E(0.6) in FIG. 2B.

FIG. 2C illustrates an example of the result obtained by correcting the preliminary estimated core usage to a final estimated core usage.

Because the sum of the estimations of the preliminary estimated core usage 230 does not exceed 2, which corresponds to the total core usage, the task allocating apparatus 100 determines the preliminary estimated core usage 230 as a final estimated core usage 250. The task allocating apparatus 100 may allocate each task to the cores based on estimations of the final estimated core usage 250. Hereinafter, the estimation of the final estimated core usage 250 is denoted as 'V (core usage)'. For example, the final estimation 250 has estimations V(0.2), V(0.4), V(0.8) and V(0.6).

When viewed in relation to the fourth period, the task allocating apparatus 100 may estimate each core usage of the tasks for the fourth period based on the core usages 200, 210 and 220 that are measured at the first period, the second period and the third period, respectively, as shown in FIG. 2A.

In FIG. 2A, when viewed in relation to the task T1, the core usage measured at the first period is 0.8, the core usage measured at the second period is 0.4 and the core usage measured at the third period is 0.3. As example, because the core usage is not maintained the same or a variation of the core usage is not constant, the task allocating apparatus 100 may estimate the average value 0.5 of the core usages 0.8, 0.4 and 0.3 of the task T1 as an estimation of a preliminary estimated core usage 240 of the task T1 for the fourth period. The estimation of the preliminary estimated core usage 240 of the task T1 at the fourth period is denoted as E (0.5) in FIG. 2B.

In FIG. 2A, when viewed in relation to the task T2, the core usage measured at the first period is 0.4, the core usage measured at the second period is 0.4 and the core usage measured at the third period is 0.1. In this example, the task allocating apparatus 100 may estimate each core usage of the tasks for the following period based on the difference between a core usage measured at a predetermined period and a core usage estimated at the predetermined period. For example, when viewed in relation to the task T2, the core usage of 0.1 measured at the third period as shown in 220 of FIG. 2A is smaller than the core usage of 0.4 estimated at the third period as shown in 230 of FIG. 2B. That is, there is a difference between an estimated core usage and a measure core usage. In this example, to reduce the difference between the estimated core usage and the measured core usage, the task allocating apparatus 100 may estimate the latest measured core usage of 0.1 as an estimation of the preliminary estimated core usage 240 of the task T2 at the fourth period. The estimation of the preliminary estimated core usage 240 of the task T2 at the fourth period is denoted as E (0.1) in FIG. 2B. As another example, to reduce the difference between the estimated core usage and the measured core usage, the task allocating apparatus 100 may average the estimate core usage and the measured core usage. For example, the apparatus may estimate the average value as 0.25 between the core usage 0.1 measured at the current period, that is, the third period and the core usage 0.4 measured at one period ahead on the current period, that is, the second period, as the core usage for the fourth period.

In FIG. 2A, when viewed in relation to the task T3, the core usage measured at the first period is 0.2, the core usage measured at the second period is 0.4 and the core usage measured at the third period is 0.8. In this example, the core usage doubles each period. Accordingly, the task allocating apparatus 100 estimates the core usage for the fourth period as 1.6 as an estimation of the preliminary estimated core usage 240 of the task T3 at the fourth period. The estimation of the preliminary estimated core usage 240 of the task T3 at the fourth period is denoted as E (1.6).

In FIG. 2A, when viewed in relation to the task T4, the core usage measured at the first period is 0.6, the core usage measured at the second period is 0.6 and the core usage measured at the third period is 0.6. In this example, the core usage is maintained in each period. Accordingly, the task allocating apparatus 100 may estimate the core usage 0.6 measured at the third period shown in FIG. 2A as an estimation of the preliminary estimated core usage 240 of the task T4 at the fourth period. The estimation of the preliminary estimated core usage 240 of the task 4 at the fourth period is denoted as E (0.6).

Referring to FIG. 2C, because the sum of the estimations of the preliminary estimated core usage 240 exceeds 2, which corresponds to the total core usage, the task allocating apparatus 100 may generate a final estimated core usage 260 by adjusting a ratio of the respective estimations of the preliminary estimated core usage 240 such that the sum of the estimations of the preliminary estimated core usage 240 is 2. The adjusting of ratio may be performed such that the final estimated core usage has a ratio that is proportional to the ratio of the preliminary estimated core usage 240. For example, the task allocating apparatus 100 may generate the final estimated core usage 260 such that each estimation of the final estimated core usage 260 depends on each estimation of "0.5:0.1:1.6:0.6" of the preliminary estimated core usage 240 and sums up to 2. As a result, the final estimated core usage 260 has estimations V(0.25), V(0.13), V(1.2) and V(0.42). The task allocating apparatus 100 may allocate each task to the cores based on the final estimated core usage 260.

As described in the examples of FIGS. 2A-2C, the task allocating apparatus 100 may estimate each core usage for the following period based on each core usage of the tasks, which having been run in multiple cores, and allocate each task to the cores based on the estimated core usage, thereby improving the performance of processing the tasks.

The task core allocating apparatus 100 may estimate each core usage for the following period based on each core usage of the tasks having been run in the multiple cores, and allocate each core to the multiple cores based on the estimated core usage for the following period, thereby improving the performance of processing tasks.

The task core allocating apparatus 100 may not allocate the tasks at a fixed ratio but may dynamically allocate the tasks at a ratio varying based on the operation characteristics of the tasks.

FIGS. 3A, 3B, and 3C illustrate additional examples of estimating tasks.

The following example includes a case in which two cores including a first core and a second core and tasks T1, T2, T3 and T4 continuously exist in a ready queue. However, the disclosure is not limited thereto, for example, the number of the cores, the number of the tasks, and the continuous existing of the tasks may vary.

FIG. 3A shows estimations of a core usage of tasks for the following period. The estimations may be obtained based on at least one core usage that is measured according to predetermined periods by the task allocating apparatus.

Referring to FIGS. 1 and 3A, the task allocating apparatus 100 periodically estimates preliminary core usages 300 and 310 for the following period based on the core usages of tasks that have been run in the multiple cores. For example, the core usages 300 and 310 may estimated in the same way that the core usages 230 and 240 described with reference to FIGS. 2A and 2B were estimated. In addition, the task allocating apparatus 100 may extract operation characteristics which are denoted as F, N, B and R in the core usages 300 and 310. The operation characteristics of the tasks may be at least one of information indicating whether the task is a real time task, information indicating the task is a foreground task or a background task, information corresponding to a list of tasks having been allocated to the cores and information indicating a priority of the tasks. A real time task, a non-real time task, a foreground task, and a background task are denoted as R, N, F, and B, respectively.

FIG. 3B illustrates an example of a policy that is applied to the example of FIG. 3A.

Referring to FIG. 3B, the policy includes policies P1, P2, P3, P4, P5, and P6. Policy P1 is a policy allowing the upper most part to be run primarily. Policy P2 is a policy allowing the real time tasks (R) to be run primarily. Policy P3 is a policy of allowing a foreground task to be primarily allocated within a core usage range of 1.7 and a background task to be allocated within a core usage range of 0.3. Policy P4 is a policy of allowing a task having an estimated core usage equal to or lower than 0.2 to be executed primarily. Policy P5 is a policy of allowing a task to have a core usage exceeding 0.1. Policy P6 is a policy of allowing core resources, which remain after the allocating of core usages has been performed as described above, to be allocated in proportional to a ratio of the estimated core usage of each task. The polices are not limited to the examples described in FIG. 3B, and may be implemented in various methods.

FIG. 3C illustrates an example of a result of allocating tasks to cores based on the estimated core usage, the operation characteristics, and the policy.

Referring to FIGS. 1, 3A, 3B, and 3C, the task allocating apparatus 100 allocates each task to the cores based on the estimated core usage, the operation information, and the policy.

For example, in FIG. 3A, when viewed in relation to the second period, an estimation of the preliminary estimated core usage 300 of the task T1 is 1.7 and operation information corresponds to F and N. An estimation of the preliminary estimated core usage 300 of the task T2 is 0.3 and operation information corresponds to B and N. An estimation of the preliminary estimated core usage 300 of the task T3 is 0.3 and operation information corresponds to B and N. An estimation of the preliminary estimated core usage 300 of the task T4 is 0.8 and operation information corresponds to B and R.

In this example, primarily, the task allocating apparatus 100 determines the estimation 0.8 of the preliminary estimated core usage 300, which is an estimation of the real time task (T4), as an estimate of a final estimated core usage 330 according to the policy 2 shown in FIG. 3B. Secondarily, the task allocating apparatus 100 determines a value of the total core usage '2' minus the determined core usage '0.8' of the task T4, that is, a core usage '1.2' as an estimation of the final estimated core usage 330 according to the policy 3 shown in FIG. 3B. Because the estimations of the final estimated core usage 330 sum up to 2, which corresponds to the total core usage, the task allocating apparatus 100 does not allocate the remaining tasks T2 and T3 to the cores. Accordingly, the final estimated core usage has the estimations V (1.2), V (0.0), V (0.0) and V (0.8). In this example, the real time task T4 has priority over non real time tasks T1, T2, and T3. Also, foreground task T1 has priority over background tasks T2 and T3. However, not all of task T1 can be allocated to the cores because the total core usage would exceed the available core processing ability. Accordingly, 1.2 estimated core usage of task T1 is allocated out of 1.7 estimated core usage of task T1.

In FIG. 3A, when viewed in relation to the third period, an estimation of the preliminary estimated core usage 310 of the task T1 is 1.4 and operation information corresponds to F and N. An estimation of the preliminary estimated core usage 310 of the task T2 is 1.2 and operation information corresponds to B and N. An estimation of the preliminary estimated core usage 310 of the task T3 is 0.2 and operation information corresponds to B and N. An estimation of the preliminary estimated core usage 310 of the task T4 is 0.1 and operation information corresponds to B and R.

In this example, primarily, the task allocating apparatus 100 allocates the estimation 0.1 of the preliminary estimated core usage 310, which is an estimation of the real time task (T4), as an estimation of a final estimated core usage 340 according to the policy 2 shown in FIG. 3B. Secondarily, the task allocating apparatus 100 determines the estimation 1.4 of the preliminary estimated core usage 310, which is an estimation of the foreground task (T1), as an estimation of the final estimated core usage 340 according to the policy 3 shown in FIG. 3B. Then, the task allocating apparatus 100 determines the estimation 0.2, which corresponds to the task T3 of the preliminary estimated core usage 310, as an estimate of the final estimated core usage 340 according to the policy 4 shown in FIG. 3B. The task allocating apparatus 100 determines the remainder '0.3', which corresponds to a value of the total core usage '2' of the task 2 minus the already taken core usage '1.7', as an estimation of the final estimated core usage 340. Accordingly, the final estimated core usage 340 has the estimations V (1.4), V (0.3), V (0.2) and V (0.1). In this example, background task T3 has priority over background task T2 based on the fourth policy.

As described herein, the task allocating apparatus allocates tasks to the cores based on the operation characteristics of the task while in operation, thereby dynamically allocating the tasks to the cores.

FIGS. 4A to 4C illustrate examples of allocating tasks to cores when a predetermined criteria is satisfied.

The following example includes a case in which two cores are provided and tasks T1 and T2 continuously exist in a ready queue. However, the disclosure is not limited thereto, and the number of the cores, the number of the tasks, and the continuous existing of the tasks may vary.

If a difference between a core usage of a task at a current period and a core usage of the task obtained at N-periods ahead on the current period is equal to or larger than a predetermined core usage difference, the task allocating apparatus may allocate the task to cores according to the estimated core usage.

FIG. 4A illustrates an example in which an estimation of the final estimated core usage at the current period is substantially changed from an estimation of the final estimated core usage at the previous period, which is just one period ahead of the current period. In this example, the predetermined core usage difference is 0.4.

In FIGS. 1 and 4A, when viewed in relation to the third period and the fourth period, the difference between the estimation of the final estimated core usage of the task T1 at the current period and the estimation of the final estimated core usage of the task T1 at the previous period is 0.1. In addition, the difference between the estimation of the final estimated core usage of the task T2 at the current period, and the estimation of the final estimated core usage of the task T2 at the previous period is also 0.1. Accordingly, the task allocating apparatus 100 does not allocate the tasks T1 and T2 to the cores.

When viewed in relation to the task T1 at the fifth period, the difference between the estimation '1.9' of the final estimated core usage at the current period and the estimation '1.5' of the final estimated core usage at the previous period is 0.4. This difference of 0.4 is equal to the predetermined core usage difference '0.4'. Accordingly, the allocating apparatus 100 allocates the tasks T1 and T2 to cores based on the final estimated core usage at the fifth period. When viewed in relation to the task T2 at the fifth period, the difference between the estimation '0.1' of the final estimated core usage at the current period and the estimation '0.5' of the final estimated core usage at the previous period is 0.4 which is equal to or larger than the predetermined core usage difference '0.4'. Accordingly, the allocating apparatus 100 allocates the tasks T1 and T2 based on the final estimated core usage. In this manner, the task allocating apparatus 100 allocates tasks to cores only when the estimated core usage substantially changes, thereby preventing the system load from increasing.

FIG. 4B illustrates an example in which an estimation of the final estimated core usage of the current period is substantially changed from an estimation of the final estimated core usage that is obtained three periods ahead of the current period, and a predetermined core usage difference is 0.4. In this example, the task allocating apparatus 100 compares an estimation of the final estimated usage of the current period with an estimation of the final estimated usage obtained three periods ahead of the current period. However, the disclosure is not limited thereto. For example, the task allocating apparatus may compare an estimation of the final estimated usage of the current period with an estimation of the final estimated usage obtained four periods ahead, N periods ahead, and the like, of the current period.

In FIGS. 1 and 4B, when viewed in relation to the task T1 at the fifth period, the difference between the estimation '1.7' of the final estimated core usage at the current period and the estimation '1.3' of the final estimated core usage obtained three periods ahead of the current period is 0.4 which is equal to or larger than the predetermined core usage difference '0.4'. Accordingly, the task allocating apparatus 100 allocates the tasks T1 and T2 to cores based on the final estimated core usage. When viewed in relation to the task T2 at the fifth period, the difference between the estimation '0.3' of the final estimated core usage at the current period and the estimation '0.7' of the final estimated core usage obtained three periods ahead of the current period is 0.4 that is equal to or larger than the predetermined core usage difference '0.4'. Accordingly, the task allocating apparatus 100 allocates the tasks T1 and T2 to cores based on the final estimated core usage. In this manner, the task allocating apparatus 100 allocates tasks to the cores only when the estimated core usage substantially changes, thereby preventing the system load from increasing.

FIG. 4C illustrate an example in which the variation of an estimation of the final estimated core usage at the current period is great and a predetermined core usage variation is 0.4.

In FIGS. 1 and 4C, when viewed in relation to the task T1, the variation of the estimation of the final estimated core usage from the second period to the fourth period is 0.3 which is below the predetermined variation '0.4', so that the task allocating apparatus 100 does not allocate the tasks T1 and T2 to the cores. When viewed in relation to the task T2, the variation of the estimation of the final estimated core usage from the second period to the fourth period is also 0.3 which is below '0.4', so that the task allocating apparatus 100 does not allocate the tasks T1 and T2 to the cores.

When viewed in relation to the task T1, the variation of the estimation of the final estimated core usage from the second period to the fifth period, that is, the absolute value of the estimation of the final estimated core usage at the second period minus the estimation of the final estimated core usage at the fifth period exceeds the predetermined variation '0.4' (i.e. 1.2-1.6), so that the task allocating apparatus 100 allocates the tasks T1 and T2 to the cores based on the final estimated core usage. When viewed in relation to the task T2, the variation of the estimation of the final estimated core usage from the second period to the fifth period, that is, the absolute value of the estimation of the final estimated core usage at the second period minus the estimation of the final estimated core usage at the fifth period exceeds '0.4' (i.e. 0.8-0.4), so that the task allocating apparatus 100 allocates the tasks T1 and T2 to the cores based on the final estimated core usage. As described herein, by use of the variation of the final estimated core usage, even when the final estimated core usage gradually changes and finally ends to a great change, the task allocating apparatus 100 allocates tasks to the cores. Accordingly, the task allocating apparatus 100 is prevented from failing to allocate tasks when the final estimated core usage gradually increases or decreases.

Figure 5:
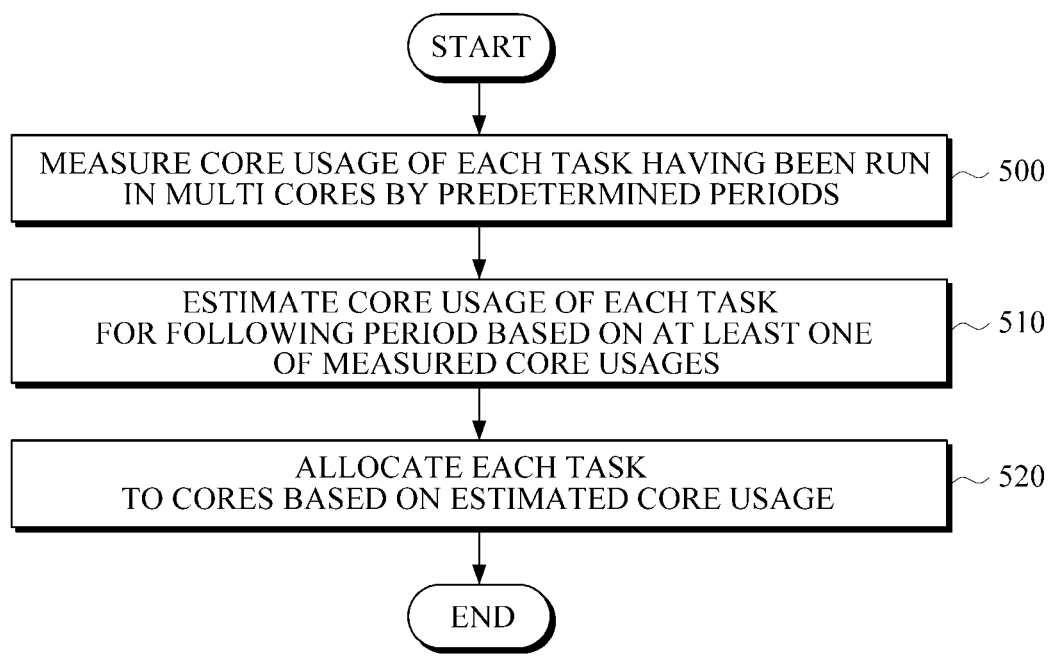
FIG. 5 is a diagram illustrating an example of a method for allocating tasks.

FIG. 5 illustrates an example of a method for allocating tasks. For example, the task allocating method may be applicable to an operating system (OS) and/or a virtual machine monitor (VMM).

Referring to FIG. 5, a task allocating apparatus measures a core usage of each of at least one task, which has been run in multiple cores, according to predetermined periods (500).

The task allocating apparatus estimates a core usage of each task for a following period based on the measured core usages (510). For example, the task allocating apparatus may extract operation characteristics of the at least one task and estimate the core usage of the at least one task for the following period based on the extracted operation characteristics of the at least one task. For example, the task allocating apparatus may estimate the core usage of each task for the following period based on at least one of the average value, the increment value, and the decrement value of the measured core usages. As another example, the task allocating apparatus may estimate the core usage of each task for the following period based on a difference between a core usage measured at a certain period and a core usage estimated at the certain period. As another example, the task allocating apparatus may estimate the core usage of each task for the following period based on at least one of the measured core usages and a predetermined policy.

The task allocating apparatus allocates each task to the cores based on the estimated core usage (520). For example, the task allocating apparatus may allocate the task to cores based on the estimated core usage if a difference between a core usage of the task estimated at a current period and a core usage of the task estimated N-periods ahead of the current period exceeds a predetermined value. As another example, the task allocating apparatus may allocate the task to the cores based on the estimated core usage if a variation of the estimated core usage exceeds a predetermined variation.

A computer-readable storage medium may store program instruction that may be used to implement a task allocating method. For example, a task allocating method may include measuring a core usage of each of at least one task, which has been run in multiple cores, according to predetermined periods, estimating a core usage of the each task for a following period based on at least one core usage of the measured core usages, and allocating the at least one task to the multiple cores based on the estimate core usage.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a is battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for allocating tasks that are run in cores, the apparatus comprising:
a processor implementing
a measuring unit configured to measure a core usage of the tasks that are run in cores, according to predetermined periods;
an estimating unit configured to estimate a core usage of each task for a following period based on the measured core usages; and
an allocating unit configured to allocate one or more of the tasks to the cores based on the estimated core usage of each task for the following period,
wherein the estimating unit is further configured to, with respect to each task, measure the core usage according to the predetermined periods, calculate preliminarily estimated core usage of each task based on a changed amount in core usage measured according to the periods, and in response to a sum of the calculated preliminarily estimated core usage being less than a threshold, determine the preliminarily estimated core usage of each task as the estimated core usage of each task,
wherein, in response to a difference between a core usage of a task estimated at a current period and a core usage of the task estimated N periods ahead of the current period exceeding a predetermined value, where N is a natural number equal to or greater than one, the allocating unit is further configured to allocate the task to the cores based on the estimated core usage.

2. The apparatus of claim 1, wherein the estimating unit is further configured to extract operation characteristics of each task and estimate the core usage of each task for the following period based on the extracted operation characteristics of each task.

3. The apparatus of claim 2, wherein the operation characteristics comprise at least one of information indicating whether a task is a real time task, information indicating whether the task is a foreground task or a background task, information corresponding to a list of tasks having been allocated to the cores and information indicating a priority of the tasks.

4. The apparatus of claim 1, wherein the estimating unit is further configured to estimate the core usage of each task for the following period based on at least one of an average value, an increment value, and a decrement value of the measured core usages.

5. The apparatus of claim 1, wherein the estimating unit is further configured to estimate the core usage of each task for the following period based on a difference between a core usage of each task measured at a certain period and a core usage of each task estimated at the certain period.

6. The apparatus of claim 1, wherein the estimating unit is further configured to estimate the core usage of each task for the following period based on the measured core usages and a predetermined policy.

7. The apparatus of claim 6, wherein the predetermined policy comprises a policy of allowing a task having a core usage lower than a predetermined core usage to be run primarily, a policy of allowing a real time task to be run primarily, and a policy of preventing a background task from having a core usage higher than a predetermined core usage.

8. The apparatus of claim 1, wherein, in response to a variation of the estimated core usage of a task exceeding a predetermined variation, the allocating unit is further configured to allocate the task to the cores based on the estimated core usage.

9. The apparatus of claim 1, wherein the estimated core usage for each task comprises an estimated ratio of total core usage by each respective task over the cores during the following period.

10. A method for allocating tasks that are run in cores, the method comprising:
measuring a core usage of the tasks that are run in cores, according to predetermined periods;
estimating a core usage of each task for a following period based on the measured core usages; and
allocating one or more of the tasks to the cores based on the estimated core usage of each task for the following period,
wherein the estimating, with respect to each task, comprises measuring the core usage according to the predetermined periods, calculating preliminarily estimated core usage of each task based on a changed amount in core usage measured according to the periods, and in response to a sum of the calculated preliminarily estimated core usage being less than a threshold, determining the preliminarily estimated core usage of each task as the estimated core usage of each task,
wherein, in response to a difference between a core usage of a task estimated at a current period and a core usage of the task estimated N-periods ahead of the current period exceeding a predetermined value, where N is a natural number equal to or greater than one, the allocating comprises allocating the task to the cores based on the estimated core usage.

11. The method of claim 10, wherein the estimating of the core usage for each task for the following period comprises:
extracting operation characteristics of each task; and
estimating the core usage of each task for the following period based on the extracted operation characteristics of each task.

12. The method of claim 11, wherein the operation characteristics comprise at least one of information indicating whether a task is a real time task, information indicating whether the task is a foreground task or a background task, information corresponding to a list of tasks having been allocated to the cores, and information indicating a priority of the tasks.

13. The method of claim 10, wherein the estimating of the core usage of each task for the following period is based on at least one of an average value, an increment value, and a decrement value of the measured core usages.

14. The method of claim 10, wherein the estimating of the core usage of each task for the following period is based on a difference between a core usage of each task measured at a certain period and a core usage of each task estimated at the certain period.

15. The method of claim 10, wherein the estimating of the core usage for each task for the following period is based on the measured core usages and a predetermined policy.

16. The method of claim 15, wherein the predetermined policy comprises a policy of allowing a task having a core usage lower than a predetermined core usage to be run primarily, a policy of allowing a real time task to be run primarily, and a policy of preventing a background task from having a core usage higher than a predetermined core usage.

17. The method of claim 10, wherein, in response to a variation of the estimated core usage of a task exceeding a predetermined variation, the allocating comprises allocating the task to the cores based on the estimated core usage.

18. A non-transitory computer-readable medium storing instructions that, when executed by a processor, cause the processor to perform a task allocating method, in which the task allocating method comprises:
measuring a core usage of tasks that are run in cores, according to predetermined periods;
estimating a core usage of each task for a following period based on the measured core usages; and
allocating one or more of the tasks to the cores based on the estimate core usage of each task for the following period,
wherein the estimating, with respect to each task, comprises measuring the core usage according to the predetermined periods, calculating preliminarily estimated core usage of each task based on a changed amount in core usage measured according to the periods, and in response to a sum of the calculated preliminarily estimated core usage being less than a threshold, determining the preliminarily estimated core usage of each task as the estimated core usage of each task,
wherein, in response to a difference between a core usage of a task estimated at a current period and a core usage of the task estimated N-periods ahead of the current period exceeding a predetermined value, where N is a natural number equal to or greater than one, the allocating comprises allocating the task to the cores based on the estimated core usage.

19. The computer-readable storage medium of claim 18, wherein the estimating comprises estimating the core usage of each task for the following period based on at least one of an average value, an increment value, and a decrement value of the measured core usages.

* * * * *